US009516346B2

(12) United States Patent
Pai M.M et al.

(10) Patent No.: US 9,516,346 B2
(45) Date of Patent: Dec. 6, 2016

(54) IMAGE PROCESSING SYSTEM AND METHOD

(75) Inventors: Manohara Pai M.M, Karnataka (IN);
Karunakar Annappa Kotegar, Karnataka (IN)

(73) Assignee: MANIPAL INSTITUTE OF TECHNOLOGY, Karnataka (IN)

( * ) Notice: Subject to any disclaimer, the term of this patent is extended or adjusted under 35 U.S.C. 154(b) by 1139 days.

(21) Appl. No.: 12/627,737

(22) Filed: Nov. 30, 2009

(65) Prior Publication Data
US 2011/0051814 A1  Mar. 3, 2011

(30) Foreign Application Priority Data
Sep. 1, 2009  (IN) .......................... 2113/CHE/2009

(51) Int. Cl.
*H04N 19/147*  (2014.01)
*H04N 19/62*  (2014.01)
*H04N 19/63*  (2014.01)
*H04N 19/17*  (2014.01)
*H04N 19/115*  (2014.01)
*H04N 19/146*  (2014.01)

(52) U.S. Cl.
CPC .............. *H04N 19/62* (2014.11); *H04N 19/17* (2014.11); *H04N 19/63* (2014.11); *H04N 19/115* (2014.11); *H04N 19/146* (2014.11)

(58) Field of Classification Search
USPC ................... 375/240.11, 240.19; 725/126
See application file for complete search history.

(56) References Cited

U.S. PATENT DOCUMENTS

| 6,026,183 A | 2/2000 | Talluri et al. |
| 6,757,434 B2 | 6/2004 | Miled et al. |
| 2001/0010705 A1* | 8/2001 | Min .................. 375/240.11 |
| 2002/0191854 A1* | 12/2002 | Kakarala et al. ............. 382/240 |
| 2003/0135867 A1* | 7/2003 | Guedalia ................ H04N 7/147 725/126 |
| 2003/0142875 A1* | 7/2003 | Goertzen ....................... 382/240 |
| 2004/0028138 A1* | 2/2004 | Piche et al. .............. 375/240.19 |
| 2005/0094731 A1* | 5/2005 | Xu ........................ H04N 19/147 375/240.19 |
| 2005/0193311 A1* | 9/2005 | Das et al. ..................... 714/753 |

(Continued)

FOREIGN PATENT DOCUMENTS

| WO | 2004/044830 | 5/2004 |
| WO | 2005/069634 | 7/2005 |

OTHER PUBLICATIONS

Wang, et al., "Bitplane-by-Bitplane Shift (BbBShhift)—A Suggestion for JPEG2000 Region of Interest Image Coding," IEEE Signal Processing Letters, vol. 9, No. 5, May 2002, pp. 160-162.

(Continued)

*Primary Examiner* — Obafemi Sosanya
(74) *Attorney, Agent, or Firm* — Brundidge & Stanger, P.C.

(57) ABSTRACT

A system and method for processing an image is provided. The system includes an encoder configured to subdivide the image into N subregions. The value of N is computed based upon a spatial resolution of the image, a granularity value and a level of wavelet decomposition. The encoder is configured to perform wavelet decomposition on each of the N subregions. The system includes memory circuitry configured to store image data resulting from the decomposition for later transmission.

18 Claims, 3 Drawing Sheets

(56) References Cited

U.S. PATENT DOCUMENTS

2009/0257480 A1* 10/2009 Wu .................. H04L 5/0007
375/211

OTHER PUBLICATIONS

ISO, ISO/ISC JTC 1/SC 29/WG 1 (ITU-T SG8) JPEG2000 Part I Final Committee Draft Version 1.0, ISO, Mar. 16, 2000.
ISO, ISO/ISC JTC 1/SC 29/WG 1 (ITU-T SG8) JPEG2000 Part II Final Committee Draft Version 1.0, ISO, Dec. 7, 2000.
Reichel, et al., "Draft of Joint Scalable Video Model JSVM-4 Annex G," ISO/IEC JTC1/SC29/WG11 and ITU-T SG16 Q.6, 17th Meeting: Nice, France, Oct. 2005.
Hsiang, S., et al., "Embedded Image Coding Using Zeroblocks of Subband/Wavelet Coefficients and Context Modeling," in Proc. MPEG-4 Workshop and Exhibition at ISCAS 2000, Geneva, Switzerland, May 2000.
ISO IEC JTC1 SC29WG11 N6880, Applications and Requirements for Scalable Video Coding, Jan. 2005, Hongkong, China.
Kim, B., et al., "An Embedded Wavelet Video Coder Using Three-Dimensional Set Partitioning in Hierarchical Trees," Proceedings of the Conference on Data Compression, pp. 251-260, 1997.
Kim, B., et al., "Low Bit-Rate Scalable Video Coding with 3D Set Partitioning in Hierarchical Trees (3D SPIHT)," IEEE Trans. Circuits and Systems for Video Technology, vol. 10, No. 8, pp. 1374-1387, Dec. 2000.
Liu, L., et al., "A New JPEG2000 Region-of-Interest Image Coding Method: Partial Signi cant Bitplanes Shift" IEEE Signal Processing Letters, vol. 10, No. 2, pp. 35-38, Feb. 2003.
Liu, Y., "Scalable Three-Dimensional SBHP Algorithm with Region of Interest Access and Low-Complexity," Applications of Digital Image Processing XXIX , Proc. SPIE vol. 6312, pp. 631209-1-631209-11, Aug. 2006.
Shapiro, J., "Embedded Image Coding Using Zerotrees of Wavelet Coefficients," IEEE Transactions on Signal Processing, vol. 41, No. 12 pp. 3445-3562, Dec. 1993.
Taubman, D., "High Performance Scalable Image Compression with EBCOT," IEEE Transactions on Image Processing, 9(7), pp. 1158-1170, Jul. 2002.
Bae, E., et al, "Multiple Region-of-Interest Support in Scalable Video Coding," ETRI Journal, vol. 28, No. 2, pp. 239-242, Apr. 2006.
International Search Report for Application No. PCT/IB2010/053682 mailed on Dec. 7, 2010.
Taubman, D. et al., "JPEG2000: Image Compression Fundamentals, Standards and Practice" Kluwer Academic Publishers, 2002, Chapter 11, Figures 11.1 and 11.3, p. 449-464.
Taubman, D. et al., "JPEG2000: Image Compression Fundamentals, Standards and Practice" Kluwer Academic Publishers, 2002, Chapter 17, Figures 17.6-17.12, p. 676-691.
Taubman, D., "Successive Refinement of Video: Fundamental Issues, Past Efforts and New Directions," International Symposium on Visual Communications and Image Processing (VCIP2003), SPIE (Jul. 2003) vol. 5150, pp. 791-805.
Bradley, A. P. and Stentiford, F. W. M., "JPEG 2000 and Region of Interest Coding," Digital Image Computing Techniques and Applications, Jan. 21-22, 2002, pp. 1-6.
Geisler, W.S. and Perry, J.S., "A real-time foveated multiresolution system for low-bandwidth video communication," Human Vision and Electronic Imaging III, SPIE Proceedings, 1998, vol. 3299, pp. 294-305.
Itti, L., "Automatic Foveation for Video Compression Using a Neurobiological Model of Visual Attention," IEEE Transactions on Image Processing, Oct. 2004, vol. 13, No. 10, pp. 1304-1318.
Karunakar, A. K. and Manohara, P. M. M., "Interactive Region of Interest Scalability for Wavelet Based Scalable Video Coder," Journal of Real-Time Image Processing, Jun. 2011, vol. 6, No. 2 pp. 93-100.
Quast, K and Kaup, A "Spatial Scalable Region of Interest Transcoding of JPEG2000 for Video Surveillance," IEEE Fifth International Conference on Advanced Video and Signal Based Surveillance, Sep. 1-3, 2008, pp. 203-210.
Vetro, A., et al., "Scalable Video Streaming Based on JPEG2000 Transcoding with Adaptive Rate Control," Advances in Multimedia, Jan. 2007, vol. 2007, No. 1, pp. 1-7.

* cited by examiner

IMAGE PROCESSING SYSTEM AND METHOD

CROSS REFERENCE TO RELATED APPLICATION

This application claims priority to Indian Patent Application Serial No. 2113/CHE/2009 filed Sep. 1, 2009, the contents of which are incorporated by reference herein in its entirety.

BACKGROUND

Image processing systems usually include, among other components, an encoder that encodes image data and a decoder that reconstructs an image using the encoded image data. In many systems, the encoder applies wavelet transforms on raw image data to divide and derive sets of data, referred to as wavelet coefficients, at different spatial resolution. In the wavelet decomposition process, coefficients are computed for pixel values within the image, as the image is progressively broken down into lower frequency and resolution images. In decoding or reconstruction, then, a resolution may be selected that provides more or less detail by selecting the appropriate level of wavelet decomposition. These techniques may also spatially subdivide the original image into a number of subregions to obtain multi-resolution representation of the image in which a desired resolution may be selected for a reduced region of interest as opposed to the entire image.

Theoretically, for each subregion, any level of wavelet transforms may be applied by the encoder. Ultimately, this process could be continued until a single coefficient at a lowest frequency level after which further decomposition will not be possible. There is typically no need for very low levels of decomposition, and the process may be usefully stopped at a desired level. Similarly, the subdivision of the image into subregions could continue until the image is divided into the original number of pixels, although the useful degree of subdivision, or number of spatially relevant regions "N" generally lies between the original image size and this limit.

In many applications, such as surveillance systems and video conferencing systems, it is often desirable to work with certain portions of the image instead of the entire image. Such portions of the image are generally referred to as regions of interest (ROIs). ROIs typically include the more important information pertaining to the image, at least for the purposes of the viewer. The use of ROIs or subregions, each wavelet encoded, enables more detailed information to be added for the subregion by reconstructing that subregion using higher frequency or resolution data (i.e., from a higher level of the decomposition).

The ROI is usually defined during the decoding process, in which a portion of the image pertaining to the ROI is selected and the additional data needed for representing the ROI in greater detail is utilized for reconstruction of just that region, and the quality of a background region may decreased, at least as compared to the ROI. In order to support ROI scalability, all of the N subregions are required to be wavelet encoded, typically with individual header information, which results in additional processing by the encoder, and storage of additional information. On the other hand, if only a few subregions are encoded, that is, the value of "N" is lowered to decrease the processing overhead, the encoder may not be able to support ROI scalability, or a very limited selection of individual regions will result.

Several techniques are currently available to obtain ROI scalability with wavelet encoding. Such techniques include a maximum shift method and generic scaling. Both techniques place bits associated to the ROI in higher bit planes and shift the bits associated to the regions other than the ROI or background regions, to lower significant bit planes. One disadvantage of this technique is that it cannot flexibly control a relative importance between the ROI and the background region by adjusting the scaling values. In other words, no information about the background regions can be received by a decoder until all the information about the ROI is decoded. In addition, such techniques may provide for ROI selection at the encoder and provide little or no flexibility to a user to interactively select the region of interest from the original image.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, according to one aspect of the present technique, a method for processing an image is provided comprising computing an optimal number N of spatially relevant subregions, subdividing the image into N subregions, performing wavelet decomposition of each of the N subregions; and storing image data resulting from the decomposition for later transmission.

In another embodiment, a system for processing an image is provided comprising an encoder configured to subdivide the image into N subregions. The value of N is computed based upon a spatial resolution of the image, a granularity value and a level of wavelet decomposition. The encoder is further configured to perform wavelet decomposition on each of the N subregions. The system further includes memory circuitry configured to store image data resulting from the decomposition for later transmission.

In another embodiment, a tangible, machine readable medium storing image data is provided. The image data comprises data encoding N spatially relevant subregions of an image, wherein the number N is computed based on upon a spatial resolution of the image, a granularity value and a level of wavelet decomposition, the data further encoding wavelet decomposition data for each of the subregions that is independently accessible at a desired wavelet decomposition level.

DETAILED DESCRIPTION

Figure 1:
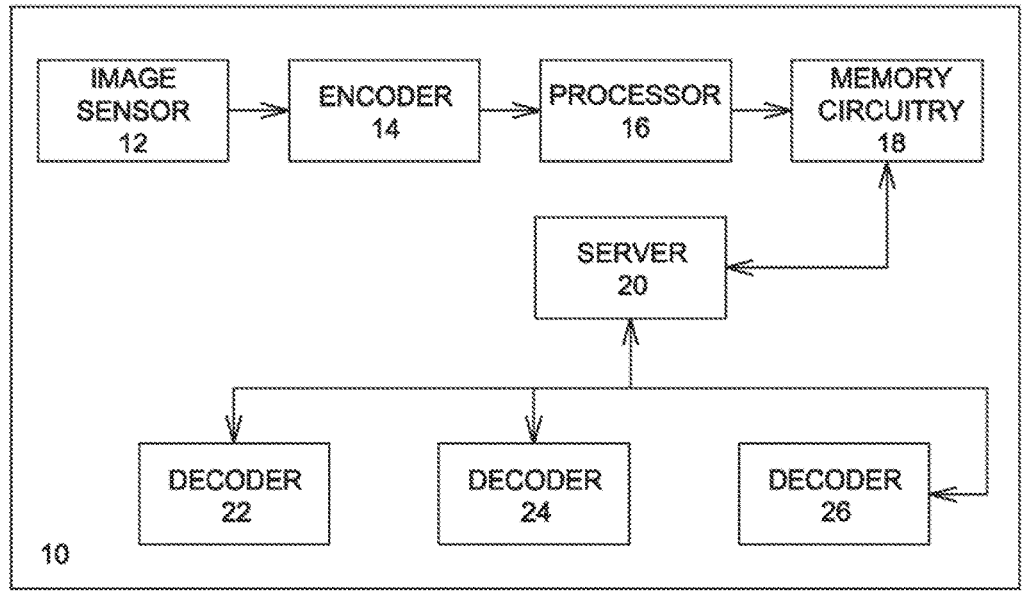
FIG. 1 is an illustrative embodiment of an image processing system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Turning now to the figures, FIG. 1 is a block diagram of one embodiment of an image processing system that includes image sensor 12, encoder 14, processor 16, memory circuitry 18, server 20 and decoders 22, 24 and 26. Each block is described in further detail below.

Image sensor 12 may typically include a camera or digital detector, for example, configured to acquire a desired image of an object. The camera may be based upon any known or future developed image acquisition technology, such as charge coupled devices. Various devices of this type may be found in digital cameras, video cameras, medical devices, and so forth. It should be noted that while reference is made in the present discussion to an image or to images, these may be frames of video captured with or without audio data. Where video data is processed, this may be pre-processed to obtain two-dimensional images or frames. Similarly, the present techniques may be employed with images that are digitized from non-digital media, such as printed or film media. The acquired digital image data is transmitted to encoder 14.

Encoder 14 is configured to subdivide the image into N number of subregions. The value of N is computed based on the following equation:

$$N = \frac{W}{2^L} \cdot \frac{H}{2^L} \cdot \frac{1}{G_x \cdot G_y} \qquad \text{Equation (1)}$$

In equation (1), the values W and H represent a spatial resolution of the original image (i.e., its pixel dimensions), L is a level of wavelet decomposition, and $G_x$ and $G_y$ are granularity dimensions of the decoder. Thus, the value of N is based upon a spatial resolution of the image, a granularity value and a level of wavelet decomposition. In one embodiment, the level of wavelet decomposition is set at the encoder. In an embodiment, the level L will define the highest and lowest resolutions that may be used for reconstruction of the entire image, and particularly for selected ROIs defined based on user-specified subregions of the overall image.

The encoder can further be configured to perform wavelet decomposition on each of the N subregions. In one embodiment, a 3D spatio-temporal wavelet transform is applied to the image. The wavelet decomposition itself may proceed in accordance with techniques such but not limited to Haar wavelets, Daubechies wavelets, etc. and will result in sets of wavelet coefficients in each of a series of spatial resolution levels L, each lower level having a lower pixel density (i.e., resolution) than the higher frequency levels above. It should be noted as well, that the N subregions may be equal in pixel dimensions, and these may typically be rectangular or square. The selection of the size and dimensions of the subregions can depend upon the original image dimensions and the number of subregions N utilized based upon Equation 1 above.

Where video image data is processed, processor 16 is configured to process the image further by performing temporal decorrelation of the image to break video data down to a series of frames or two-dimensional images. In such cases, the decomposition is then carried out on the two-dimensional images. Memory circuitry 18 is configured to store the processed image for later transmission. The image may be transmitted to any one or all of decoders 22, 24 and 26.

Decoders 22, 24 and 26 are configured to send a request for the image to server 20. The request may originally be for the original image or for video data containing a series of images, and ultimately may include a selection of a region of interest within the image that is less than the entire image. Different types of decoders can be used, and the environment in which both the encoder and decoder operate may be defined by an established CODEX. Example embodiments of decoders include but are not limited to personal computers on which images or video are viewed, work stations, such as in medical contexts, personal handheld devices, such as cellular telephones, mobile internet devices, and so forth. In one embodiment, the selection of the region of interest is performed by a user interacting with the one or more decoders. In another embodiment, the selection of the region of interest is performed automatically. From the user's standpoint, this selection may occur or be presented as a type of "zoom" in which a desired portion of the image or video is selected via an interface device, typically a physical or virtual button, region outlining tool, touch screen interface and so forth.

Server 20 is configured to receive the request for the image, the request including the selection of the region of interest. The server is configured to determine which of the N subregions corresponds to the selected region of interest. Once the respective N subregions are determined, image data is transmitted to the decoders accordingly. As noted above, this process may actually occur progressively, with an initial spatial resolution (corresponding to a desired level L of the decomposition) being sent to the viewer, with all N regions represented, followed by user selection of the ROI, and then by transmission of higher resolution (frequency) image data for the subregions determined to be in the ROI.

In one embodiment, the server is configured to transmit image data for the subregions of the selected region of interest with more high frequency data than other subregions generally referred to as background region. In another embodiment, the server is configured to transmit only image data for the subregions of the selected region of interest.

Decoders 22, 24 and 26 receive the image data of the selected region of interest and the background region and reconstruct the image (or images for video) accordingly. The manner in which the image is reconstructed such that the region of interest has a higher quality than the background region is described in further detail below.

Figure 2:
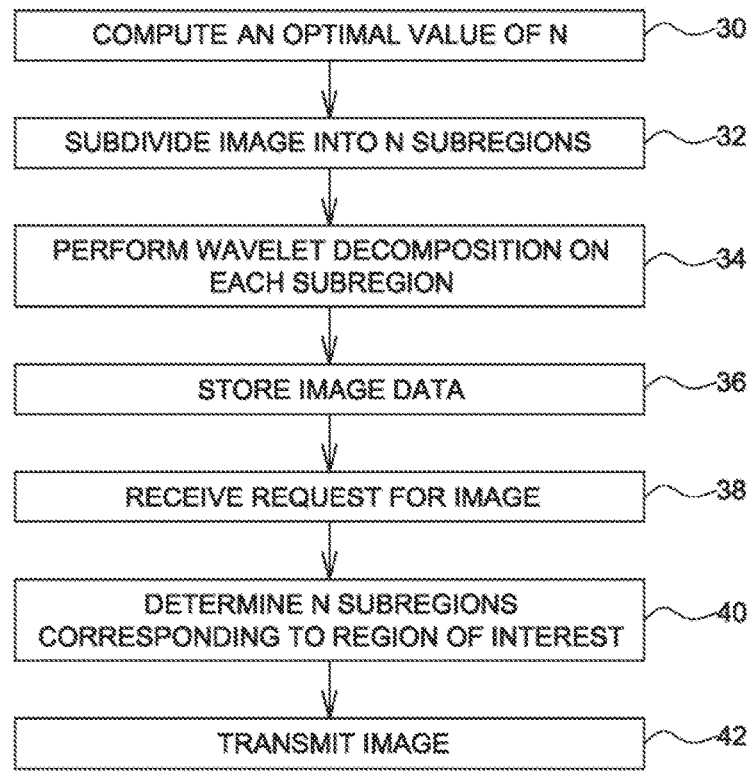
FIG. 2 is a flow chart illustrating one technique by which interactive region of interest scalability is achieved at a decoder.

FIG. 2 is a flow chart illustrating one method by which interactive region of interest scalability is achieved at a decoder. The method begins at step 30 where an optimal value for N is calculated for an image. The value of N is computed based upon a spatial resolution of the image, a granularity value and a level of wavelet decomposition.

At step 32, the image is subdivided into N subregions. At step 34, suitable wavelet decomposition techniques are applied on each subregion. At step 36, the image data resulting from the decomposition of the N subregions are stored for later transmission.

At step 38, a request is received for transmission of the image. The request includes a selection of a region of interest within the image. In one embodiment, the area of the selected region of interest is less than the entire image. At step 40, the N subregions corresponding to the selected region of interest are determined.

At step 42, the image is transmitted such that the image data for the subregions of the selected region of interest are transmitted with more high frequency data than other subregions. The technique is further described below with an example in FIG. 3-FIG. 5.

Figure 3:
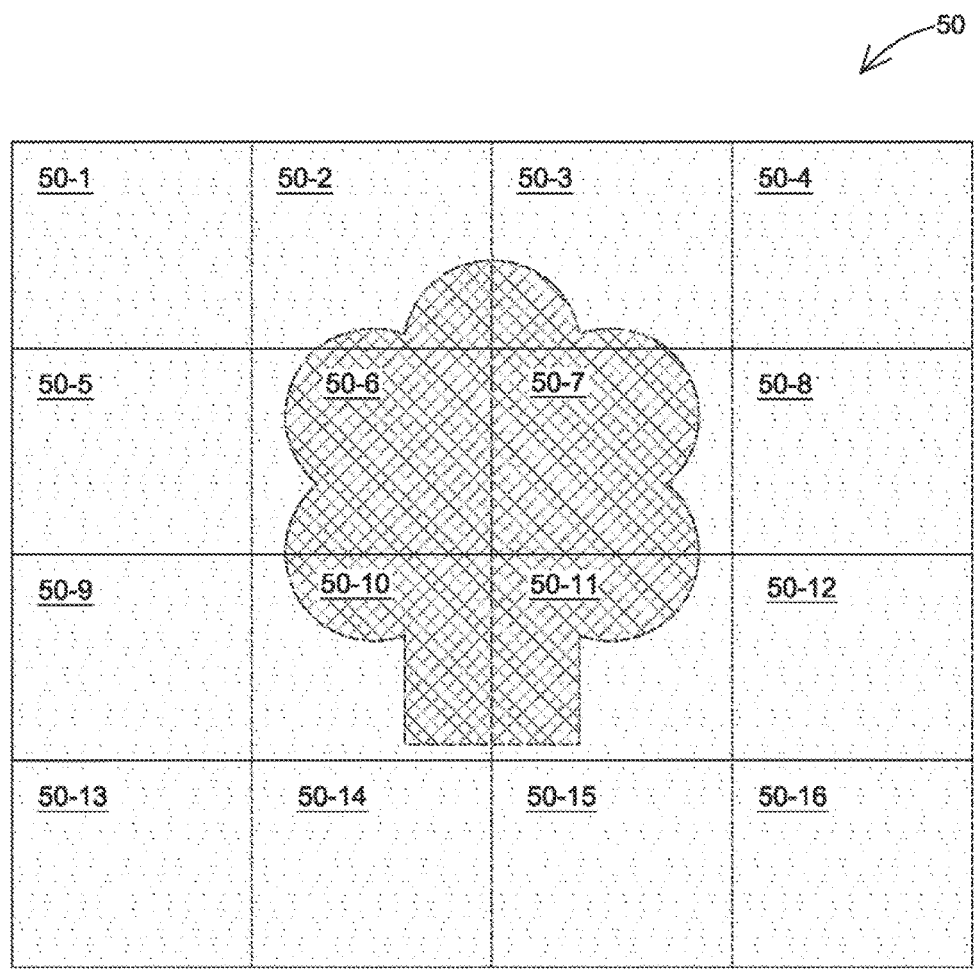
FIG. 3 is an illustrative embodiment of an image divided into several subregions.

FIG. 3 is an illustrative example image 50 divided into several subregions. In an embodiment, illustrative example image 50 is a video image of resolution 288×352. The level of decomposition is set at 3 and the lowest granularity supported by the decoder is 9×11.

The number of subregions is computed as described in step 30 of FIG. 2 and by applying Equation 1 above. In the illustrated example, the value of N is 16. As shown in FIG. 3, image 50 is divided in into 16 subregions generally represented by reference numerals 50-1 through 50-16. In an embodiment, this number of subregions is the optimal number for the particular original image dimensions, the desired number of decomposition levels L, and the selected lowest granularity supported. Use of this number of subregions will enable the maximum degree of scalability for the specified conditions, while enhancing computational and data storage efficiency.

Figure 4:
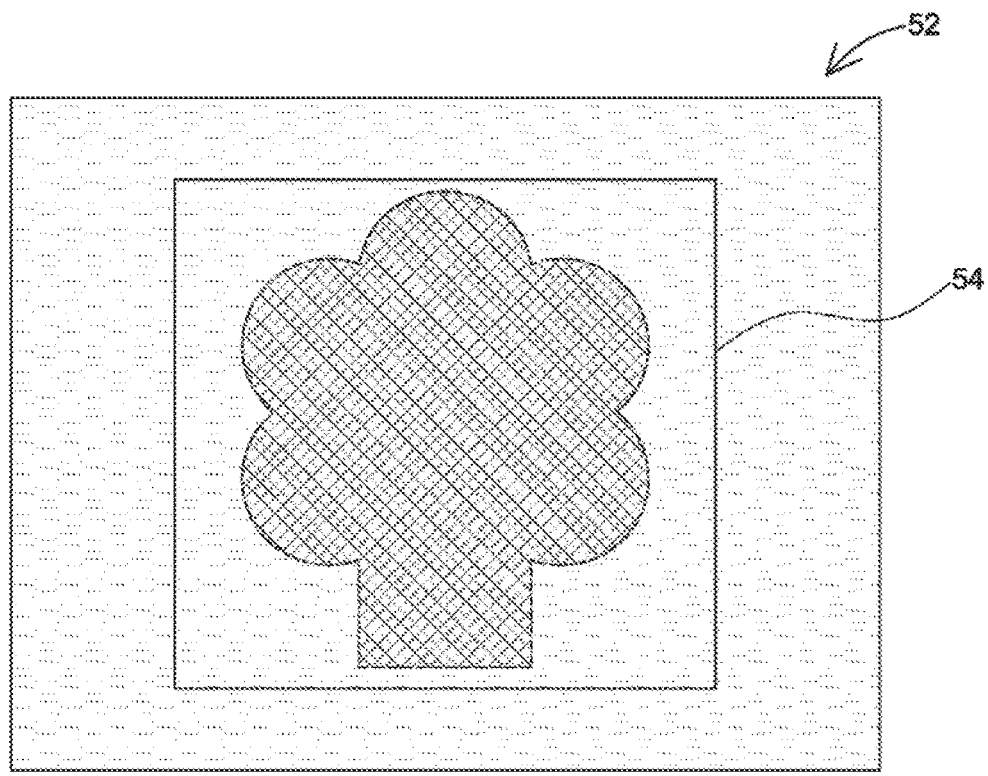
FIG. 4 is an illustrative embodiment of an image including a region of interest selection.

Referring to FIG. 4, in an embodiment a user can select a region of interest 54 in the reconstructed image 52. The decoder sends a request to a server, for example, with the selected region of interest. It may be noted that the region of interest 54 is lesser in size than the entire image 52. In one embodiment, the decoder also transmits an available bandwidth and a spatial resolution of the decoder to the server.

In one embodiment, the spatial location of the region of interest is determined using the following relationships. The two diagonally opposite corners of the ROI are represented by the coordinates (x1, y1) and (x2, y2). The corresponding spatial position in an L level decomposed image can be calculated using the following equations:

$$x_{k,l}^1 = \left\lfloor \frac{x_{k-1,l}^1}{2} \right\rfloor + L \times \frac{W}{2^k}, \quad x_{k,l}^2 = \left\lfloor \frac{x_{k-1,l}^2}{2} \right\rfloor + L \times \frac{W}{2^k} \quad \text{Equation (2)}$$

$$y_{k,l}^1 = \left\lfloor \frac{y_{k-1,l}^1}{2} \right\rfloor + L \times \frac{W}{2^k}, \quad y_{k,l}^2 = \left\lfloor \frac{y_{k-1,l}^2}{2} \right\rfloor + L \times \frac{W}{2^k} \quad \text{Equation (3)}$$

where k is level of spatial decomposition.

Referring again to FIG. 3, in an embodiment, the server is configured to determine a set of subregions among the N subregions that corresponds to the selected ROI. In one embodiment, if the ROI is not exactly overlapping on the boundary of the available subregions, the surrounding subregions are considered. That is, those subregions are selected that will provide the entire ROI selected by the user.

Figure 5:
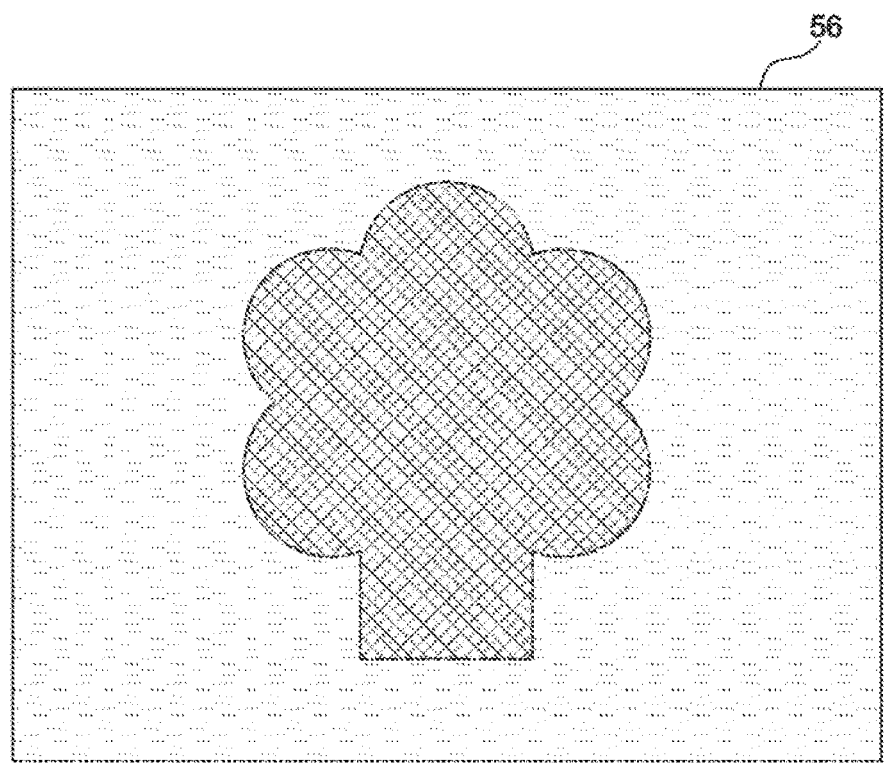
FIG. 5 is an illustrative embodiment of an image illustrating a high quality of a region of interest displayed at a decoder.

In an embodiment, the server can assign a higher bit budget to the selected ROI subregions than the non-ROI regions or background region transmitted to the decoder. The received image data is then decoded individually to reconstruct image 56 as shown in FIG. 5. The reconstructed image is of a higher quality in the selected ROI compared to the background regions. Thus the available low bandwidth at the decoder is efficiently used to view the required ROI. It should be noted that the process may result in little or no transmission of background region data at all. That is, if desired, only the ROI data may be transmitted, in higher resolution, once the ROI is selected.

In an embodiment, region of interest scalability is provided at the decoder. In an embodiment, the technique provides flexibility to a user to accurately select a region of interest within the image. In addition, by computing an optimum value for N, the computational complexity required by the encoder is substantially reduced, as is the memory utilized, thereby reducing the overall cost of the system, and improving its efficiency.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for processing an image comprising:
   optimizing a number N of spatially relevant subregions of the image based upon: a spatial resolution of the image, a lowest granularity supported for a decoder, and a level of wavelet decomposition;
   subdividing the image into N subregions based on the optimizing of the number N, the N subregions having equal pixel dimensions;
   performing wavelet decomposition of each of the N subregions; and
   storing image data resulting from the decomposition.

2. The method of claim 1, wherein the optimal number N is computed based upon the relationship:

$$N = \frac{W}{2^L} \cdot \frac{H}{2^L} \cdot \frac{1}{G_x \cdot G_y}$$

where W and H are dimensions of the image, L is a level of wavelet decomposition, and $G_x \cdot G_y$ define a granularity supported by a decoder.

3. The method of claim 1, comprising determining the level of wavelet decomposition.

4. The method of claim 1, comprising:
   receiving a request for the image, the request including a selection of a region of interest that is less than the entire image; and
   determining the N subregions corresponding to the selected region of interest.

5. The method of claim 4, further comprising transmitting image data for the subregions of the selected region of interest with more high frequency data than other subregions.

6. The method of claim 4, further comprising transmitting only image data for the subregions of the selected region of interest.

7. The method of claim 1, wherein the image data is derived from video data.

8. The method of claim 7, comprising performing subdividing the image into the N subregions, performing the wavelet decomposition of each of the N subregions, and storing the image data resulting from the decomposition for later transmission for a plurality of two-dimensional images obtained from the video data.

9. A system for processing an image, comprising:
   an encoder configured to subdivide the image into N subregions of equal pixel dimensions, wherein a value of N is optimized based upon: a spatial resolution of the image, a lowest granularity value supported for a decoder, and a level of wavelet decomposition, and wherein the encoder is configured to perform wavelet decomposition on each of the N subregions;
   memory circuitry, in communication with the encoder, configured to store image data resulting from the decomposition.

10. The system of claim 9, further comprising one or more decoders configured to send a request for the image, the request including a selection of a region of interest that is less than the entire image.

11. The system of claim 10, wherein the selection of the region of interest is performed by a user interacting with the one or more decoders.

12. The system of claim 10, wherein the selection of the region of interest is performed automatically.

13. The system of claim 10, comprising a server configured to:
   receive the request for the image, the request including the selection of the region of interest that is less than the entire image;
   determine which of the N subregions corresponds to the selected region of interest; and
   transmit image data for the N subregions of the selected region of interest with more high frequency data.

14. A non-transitory computer readable medium having stored therein instructions executable by a computing device that, if executed by the computing device, cause the computing device to perform operations comprising:

optimizing a number N of spatially relevant subregions of an image based upon: a spatial resolution of the image, a lowest granularity supported for a decoder, and a level of wavelet decomposition;

receiving data encoding N spatially relevant subregions of the image based on the optimizing of N; and encoding wavelet decomposition data for each of the N subregions that is independently accessible at a desired wavelet decomposition level, the N subregions having equal pixel dimensions.

15. The non-transitory computer readable medium of claim 14, wherein the N is computed based upon the relationship:

$$N = \frac{W}{2^L} \cdot \frac{H}{2^L} \cdot \frac{1}{G_x \cdot G_y}$$

where W and H are dimensions of the image, L is a level of wavelet decomposition, and $G_x \cdot G_y$ define a granularity supported by a decoder.

16. The method of claim 1, wherein the image is a video image and the method further comprises temporally decorrelating the video image into two-dimensional images;
wherein the subdividing of the image subdivides each of the two-dimensional images into N subregions based on the optimizing of N; and
wherein the wavelet decomposition is performed of each of the N subregions of each of the two-dimensional images.

17. The system of claim 9, further comprising a processor configured to temporally decorrelate video data to obtain the image.

18. The non-transitory computer readable medium of claim 14, wherein the image is a video image and the instructions, if executed by the computing device, cause the computing device to perform operations further comprising temporally decorrelating the video image into two-dimensional images;
wherein the wavelet decomposition is encoded for each of the N subregions of each of the two-dimensional images.

* * * * *